UNITED STATES PATENT OFFICE.

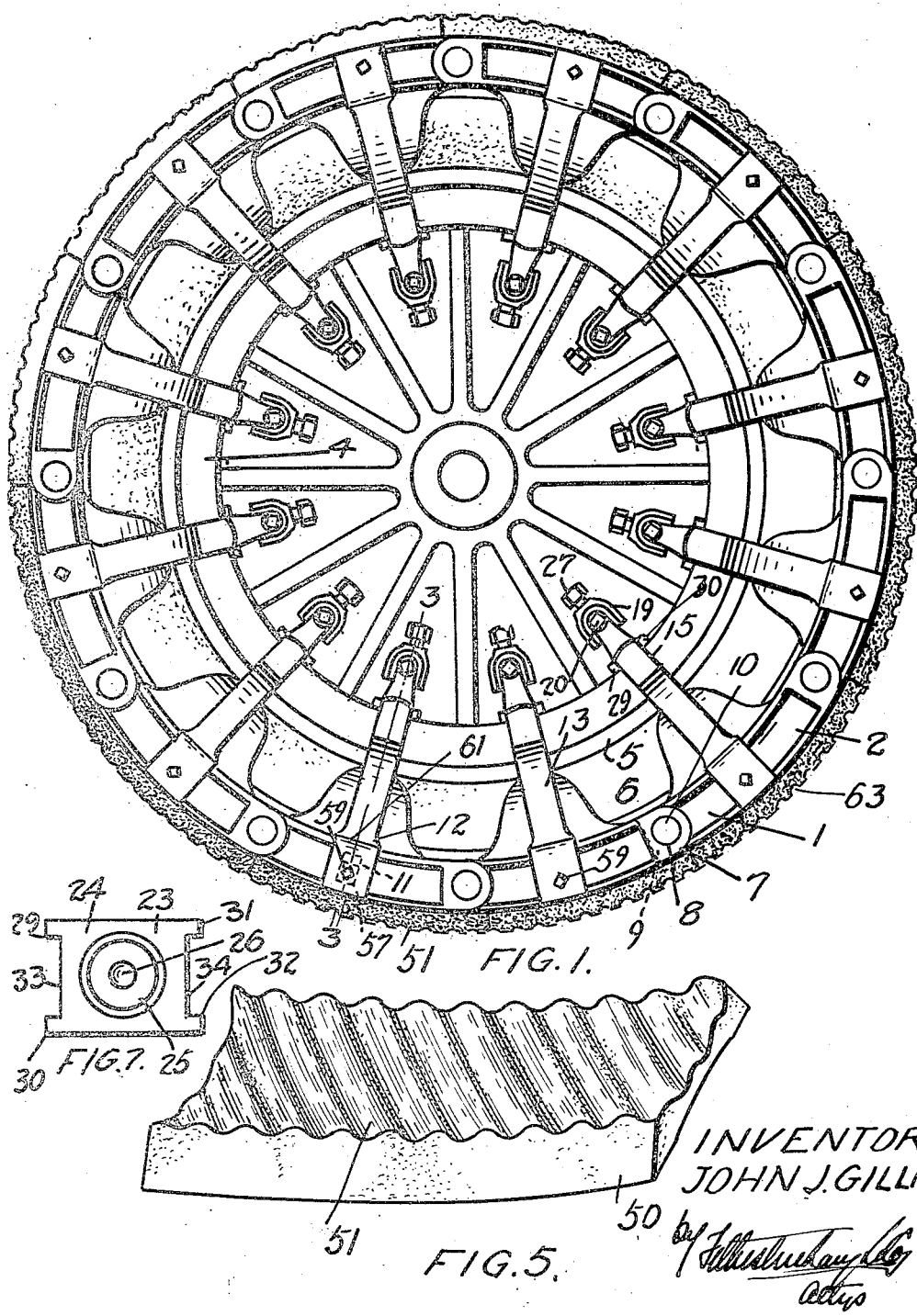

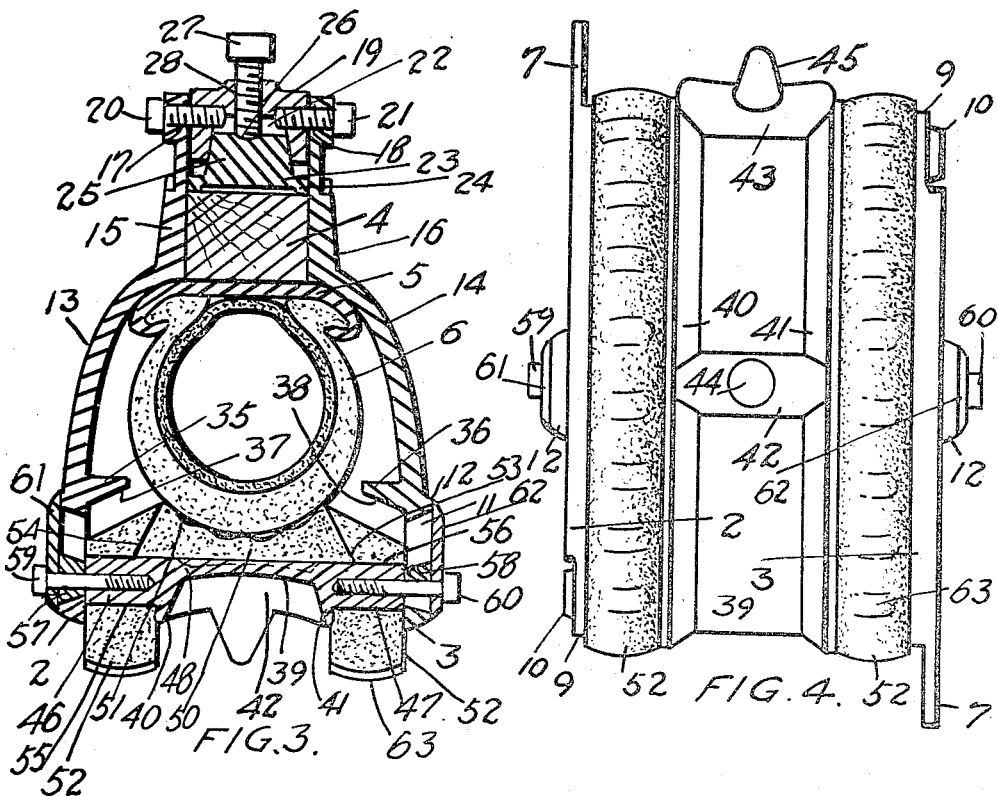
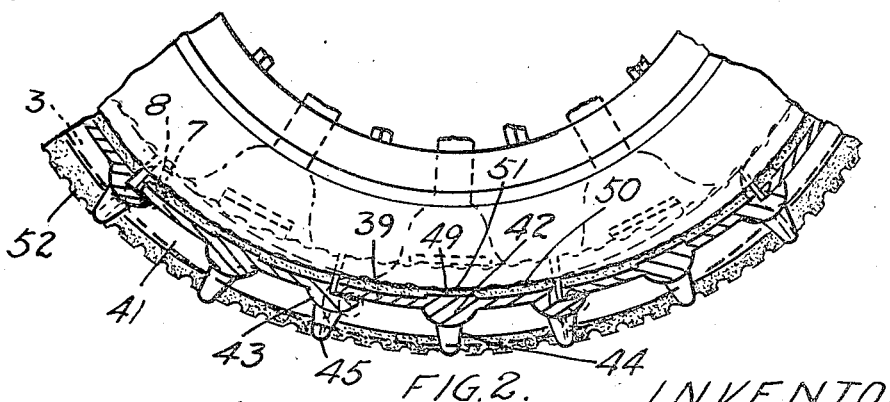

JOHN JOSEPH GILLIYN, OF OSHAWA, ONTARIO, CANADA.

TRACTION-TREAD FOR PNEUMATIC TIRES.

1,380,952.　　　Specification of Letters Patent.　　Patented June 7, 1921.

Application filed May 3, 1920. Serial No. 378,642.

*To all whom it may concern:*

Be it known that I, JOHN JOSEPH GILLIYN, piano maker, of the town of Oshawa, in the county of Ontario, in the Province of Ontario, Canada, have invented certain new and useful Improvements in Traction-Treads for Pneumatic Tires, of which the following is the specification.

My invention relates to improvements in traction treads for pneumatic tires and the object of the invention is to devise a traction tread which will have positive traction qualities which will have a maximum life which will not affect the resilient qualities of the pneumatic tire and which at the same time will render the tire puncture proof.

My invention consists essentially of a series of carrier sections arranged end to end circumferentially around each side of the tire and linked together and clamped against the interior periphery of the felly, and a tread traction section carried by each carrier section and so held thereby as to have a direct inward or radial limited movement and a swinging movement in order to conform with the compression of the tire as it passes into contact with the ground, all as hereinafter more particularly described and illustrated in the accompanying drawing in which:—

Figure 1 is a side elevation of an automobile wheel showing my traction tread applied thereto and showing all the tread sections in their normal positions.

Fig. 2 is a longitudinal sectional view through a portion of my traction tread showing the corresponding portion of the pneumatic wheel in full and the tread sections in the position they assume when the wheel is bearing upon the ground.

Fig. 3 is an enlarged cross sectional view on line 3—3 Fig. 1.

Fig. 4 is an enlarged detail looking edgewise at one of the tread sections.

Fig. 5 is an enlarged sectional perspective detail of the rubber sectional tread piece against which the tread of the pneumatic tire directly bears.

Fig. 6 is an enlarged perspective detail of the tread plate which carries the rubber section illustrated in Fig. 5.

Fig. 7 is a plan detail of one of the clamping pieces which bears against the inner periphery of the felly.

In the drawings like characters of reference indicate corresponding parts in each figure.

1 indicates my traction tread carrier which is formed by a series of arc shaped plates 2 and 3, a series of plates 2 being arranged circumferentially around one side of the tire and the series of plates 3 around the opposite side of the tire. Each plate 2 and 3 is curved concentrically to the center of the automobile wheel 4, such automobile wheel being provided with a felly, rim 5 and pneumatic tire 6. Each plate 2 and 3 is provided at one end with a lug 7 having an orifice 8 and at the opposite end with a lug 9 having a circular projection 10 which fits into the orifice 8 of the next adjacent plate 2 or 3.

It will be noted on referring to Fig. 4 that the plates 2 and 3 are reversely set. The center of each plate 2 and 3 is provided with a rectangular orifice 11 which is formed in a slight enlargement 12 of each plate. From the enlargements 12 of the plates 2 and 3 extend upwardly and inwardly curved arms 13 and 14, the upper ends of the arms 13 and 14 extending against each side of the felly of the wheel 4. The inner ends of the arms 13 and 14 are provided with portions 15 and 16 bearing against each side face of the felly of the wheel 4. The portions 15 and 16 extend inwardly beyond the inner periphery of the felly and are provided with opposing orifices 17 and 18. 19 is a swinging cap mounted between the portions 15 and 16 upon screws 20 and 21 which pass through the internally threaded orifices 17 and 18. The cap member 19 is provided with a tapered recess 22. 23 is a clamping piece comprising a rectangular plate portion 24 from which extends a central upwardly tapered projection 25, fitting into the tapered recess 22. The upwardly projecting portion 25 is provided with a central recess 26. 27 is a cap screw which is screwed into an internally threaded orifice 28 formed in the top of the cap member 19 so as to bear at its lower end in the recess 26. The rectangular plate portion 24 bears against the inner periphery of the felly and is provided with projections 29, 30, 31 and 32 forming recesses 33 and 34 into which the portions 15 and 16 fit, the portions 15 and 16 forming a guide for the plate piece 24 as this piece moves radially inwardly and outwardly as it is adjusted in position.

35 and 36 are limiting lugs which extend inwardly from the arms 13 and 14 and are provided with inclined lower faces 37 and 38 for a purpose which will hereinafter appear.

All the parts which I have hitherto described refer to the tread carrier. I will now describe the tread section proper.

39 is a tread plate which is arc shaped, longitudinally and which is provided on its lower or outer faces with outwardly inclined flange sections 40 and 41 which when the sections are arranged end to end form two annular flanges extending entirely around the tire. The flange sections 40 and 41 are connected together intermediately of their length by a cross rib 42 and at one end with a cross rib 43, so arranged as to overlap the tread plate 39 and flange sections 40 and 41 of the next adjacent section. The cross ribs 42 and 43 are provided with spicular projections 44 and 45. 46 and 47 are trunnions extending laterally from each side of each tread plate.

It will be noticed on referring particularly to Fig. 6 that the upper face of the tread plate is recessed at 48, the base of the recess being arched and the sides of the recess being connected together intermediately of their length by a cross rib 49 for a purpose which will hereinafter appear.

50 are rubber tread sections which fit the upper face of the plate 39, the inner face of each rubber tread piece being concaved crosswise and formed longitudinally concentric to the center of the automobile wheel. The inner face of the tread pieces 50 are provided with cross corrugations 51 which are set diagonally, thereby preventing any tendency for the rubber tread pieces to creep upon the tire and by reason of the outer face of the tread piece conforming to the shape of and fitting the tread plate 39 prevents any tendency for the rubber tread piece to creep upon the tread plate.

It will be noted on referring particularly to Fig. 3 that the sides of the tread plate 39 and the sides of the tread piece 50 are inclined inwardly. 52 are outer rubber tread pieces located at each side of each tread plate and provided with angular opposing recesses 53 and 54 into which the inclined sides on the tread plate 39 and tread piece 50 fit. The outer tread pieces 52 and 52 are provided intermediately of their length with orifices 55 and 56 into which the trunnions 46 and 47 extend.

In order to swingably support the tread sections between the plates 2 and 3 of the carrier member and also at the same time to provide for their direct inward radial movement I have provided rectangular pieces 57 and 58 which fit into the rectangular orifices 11, and are slidable longitudinally thereof, that is to say in a radial direction in relation to the wheel. 59 and 60 are cap screws which extend through the pieces 57 and 58 and centrally into the trunnions 46 and 47 thereby forming a swinging support for the trunnions.

It will thus be seen that each tread section swings on the screws 59 and 60 and also is permitted to move radially inward by reason of the screws being supported in the rectangular pieces 57 and 58 which are slidably held within the orifices 11.

In order to prevent dirt entering the orifices 11, I have provided cover plates 61 and 62. The outer rubber tread pieces 51 and 52 may be provided with cross grooves 63 in order to increase their tractive qualities. On referring to Fig. 2 it will be seen that when the pneumatic tire comes into contact with the ground and is compressed by reason of the weight of the vehicle, the tread section which is directly below the point of compression, moves radially inward so as to follow the compressed periphery of the pneumatic tire, such radially inward movement being limited by the lug projections 35 and 36, the upper inclined face of the outer tread sections 52 and 52 engaging the inclined faces 37 and 38 of such lugs, and the sections at each side of the point of compression are swung inward longitudinally so as to follow the curve which is formed by the pneumatic tire at each side of the point of compression.

From this description it will be seen that I have devised a traction tread which will be absolutely puncture proof, which will be flexible so as to follow the deformation of the pneumatic tire as it is compressed and at the same time it is so constructed as to produce a positive traction, either when traveling over a road when in a normal condition or when the road is more or less muddy or greasy.

What I claim as my invention is.

1. A traction tread for pneumatic tires, comprising an annular carrier adapted to be supported by an automobile wheel, and to extend at each side of the pneumatic tire, and tread sections supported by the carrier against the tread of the pneumatic tire and end to end so as to extend annularly around the tire, means for permitting the independent radial movement of each section and an independent rocking movement of each section, and clamping means adapted to draw the carrier inward and the tread sections against the tread of the tire.

2. A traction tread for pneumatic tires, comprising a carrier extending at each side of the tire and adapted to be supported by the wheel, tread sections arranged end to end around the tire and between the sides of the carrier and comprising outer tread portions adapted to contact with the ground and an inner tread portion adapted to contact with the tread of the pneumatic tire, and means for independently supporting the tread sections between the sides of the carrier so that they are capable of inward radial movement and a rocking movement parallel with the face of the wheel.

3. A traction tread for pneumatic tires, comprising a carrier member adapted to be supported by the automobile wheel and having its sides extending at each side of the pneumatic tire, tread sections arranged between the sides of the carrier, and end to end annularly around the tire, each tread section comprising a base plate swiveled intermediately of its length between the sides of the carrier, an inner tread piece carried by the tread plate to contact with the tread of the pneumatic tire and outer tread pieces carried by the tread plate at each side thereof.

4. A traction tread for pneumatic tires, comprising a carrier member provided with arms extending at each side of the pneumatic tire and having slots therein, tread sections arranged end to end annularly around the tire and between the arms of the carrier each comprising a tread plate, an inner tread piece carried by the tread plate in contact with the tread of the tire, and outer tread pieces carried by the tread plate at each side of the inner tread piece, blocks slidable within the slots of the carrier arms and screws extending through the block into the tread plate.

5. A traction tread for pneumatic tires, compising a carrier member provided with arms extending at each side of the pneumatic tire and having slots therein, tread sections arranged end to end annularly around the tire and between the arms of the carrier, each comprising a tread plate, an inner tread piece carried by the tread plate in contact with the tread of the tire, and outer tread pieces carried by the tread plate at each side of the inner tread piece, blocks slidable within the slots of the carrier arms, and screws extending through the block into the tread plate, and means for drawing the tread sections into contact with the tire.

6. A traction tread for pneumatic tires, comprising a carrier member provided with arms extending at each side of the pneumatic tire and having slots therein, tread sections arranged end to end annularly around the tire and between the arms of the carrier, each comprising a tread plate, an inner tread piece carried by the tread plate in contact with the tread of the tire, and outer tread pieces carried by the tread plate at each side of the inner tread piece, blocks slidable within the slots of the carrier arms and screws extending through the block into the tread plate, a cap swung between the inner arms of the carrier, a plate adapted to bear against the inner periphery of the felly and having a projection extending into the cap member and having guiding recesses into which the arms of the carrier slidably fit, and a setscrew extending through the cap member against the projection of the plate .

JOHN JOSEPH GILLIYN.